United States Patent

Konno

[15] 3,688,044

[45] Aug. 29, 1972

[54] AUTOMATIC TELEPHONE ANSWERING APPARATUS

[72] Inventor: Akira Konno, No. 3-9 Hiratsuka 1-chome, Shinagawa-ku, Tokyo, Japan

[22] Filed: Feb. 3, 1971

[21] Appl. No.: 112,195

[30] Foreign Application Priority Data

Feb. 3, 1970 Japan ........................45/9460

[52] U.S. Cl. ..........................179/6 R, 179/100.1 VC

[51] Int. Cl. .............................................H04m 1/64

[58] Field of Search...179/6 R, 6 AC, 6 C, 100.1 VC, 179/1 VC

[56] References Cited

UNITED STATES PATENTS 2,815,401 12/1957 O'Dwyer....................179/6 R

*Primary Examiner*—Bernard Konick
*Assistant Examiner*—Raymond F. Cardillo, Jr.
*Attorney*—Sughrue, Rothwell, Mion, Zinn & Macpeak

[57] ABSTRACT

An automatic telephone answering apparatus which keeps recording an incoming message as long as the pause time is not over a certain period, for example 10 seconds. The apparatus, however, stops recording after a maximum recording time, for example 60 seconds.

5 Claims, 2 Drawing Figures

INVENTOR.
AKIRA KONNO
BY Sughrue, Rothwell, Mion, Zinn & Macpeak
ATTORNEYS

AUTOMATIC TELEPHONE ANSWERING APPARATUS

BACKGROUND OF THE INVENTION

1. Field of the Invention

This invention relates generally to an automatic telephone answering apparatus, and more particularly to an automatic telephone answering apparatus which records incoming messages efficiently.

2. Description of the Prior Art

Prior art automatic telephone answering apparatuses operate as follows; when a telephone is called, DC circuit (talking circuit) of a telephone line is closed and an outgoing message which has been recorded on a magnetic tape is reproduced and read out to a caller to inform him that the owner of the telephone is now absent and wants to record the message of the caller. At the same time, with the closing of the DC circuit, a timer, limiting the total time of the answering operation, begins its operation. After the reading of the outgoing message, a signal called a beep tone is sent out to the caller to inform him that a recorder is prepared and the caller's message can be recorded for a predetermined time period (usually about 30 seconds). In this situation, the predetermined period, for example 30 seconds, is the remaining period of the total time less the time of the outgoing message and the beep tone. After the predetermined period, all functions of the apparatus return to the stand-by state to await the next call irregardless of whether the incoming message is completed.

The prior art apparatus has many disadvantages. First, if the incoming message is concluded in about 10 seconds, a tape for recording the incoming message continues to record for the predetermined time period, in spite of the fact that there is no signal to record. This occupies the telephone line needlessly. Second, when the length of the incoming message is longer than the predetermined time period for recording, the recording operation is stopped after the time period and the apparatus returns to the stand-by state notwithstanding that the incoming message has not been completely recorded. Third, the time for recording lapses whether the incoming message is being sent or not. For example, when the time for recording is 30 seconds and the total time during which the caller does not send any messages because he is silently reading a paper (or looking for a paper) is 10 seconds, the total time during which the incoming message can be recorded is substantially only 20 seconds.

To resolve the above-mentioned first and second disadvantages some automatic telephone answering apparatuses have been provided in which the recording state is held by the incoming message itself and is stopped when the incoming message ceases for a certain period, for example 10 seconds or more. In these apparatuses, the tape for incoming messages is wasted in large quantities, when the caller's message is not brief. Therefore, the recording capacity for the next callers is remarkably decreased.

SUMMARY OF THE INVENTION

It is therefore the primary object of this invention to provide a novel and improved automatic telephone answering apparatus in which the above-mentioned defects are overcome.

It is a further object of this invention to provide an automatic telephone answering apparatus which has three functions. First, the apparatus returns to the stand-by state immediately if the incoming message ceases for 10 or more seconds. Second, the apparatus stays in its recording state making use of the incoming message signal when the incoming message comes continuously without pause for under about 10 seconds. Third, the apparatus returns to the stand-by state when the recording period is maintained for a period of time, for example 60 seconds, except the short pause times. The apparatus prevents the recording tape from being wasted, gives sufficient recording time to a caller, and disconnects a telephone call when the recording time of one telephone call becomes too long.

DESCRIPTION OF THE PREFERRED EMBODIMENT

Figure 1:
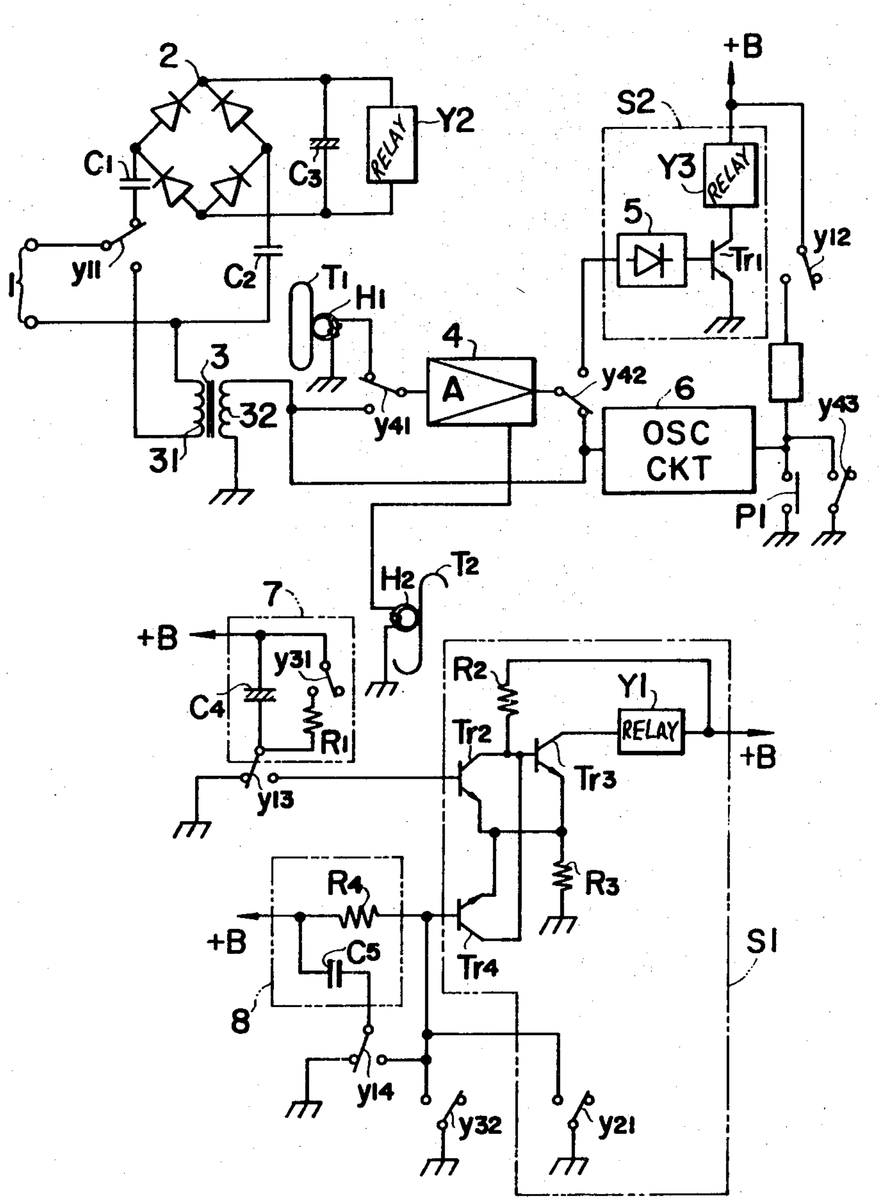
FIG. 1 is a circuit of the preferred embodiment of the present invention.

Referring to FIG. 1, 1 is a terminal to be connected with a telephone line. The terminal 1 is connected to a rectifier circuit 2 by and through a contact y11 and condensers C1 and C2. Between output terminals of the rectifier circuit 2, a condenser C3 and a relay Y2 are connected parallel to each other. The terminal 1 is selectively connected to a primary winding 31 of a transformer 3 through the contact y11. One terminal of a secondary winding 32 of the transformer 3 is grounded, and the other terminal is connected to an input terminal of an amplifier 4 through a contact y41 of a relay 4. The contact y41 is also connected with a magnetic head H1 which is associated with an endless tape T1. Recorded on endless tape T1 is an outgoing message. T1 is driven when a contact of relay Y1 (not shown) is closed. When the endless tape T1 short-circuits an electrode and causes a beep tone to be generated to inform the caller that the outgoing message is completed.

An output terminal of the amplifier 4 is connected to the base of a transistor Tr 1 by and through a contact y42 of the relay Y4 and a rectifier circuit 5. The emitter of the transistor Tr 1 is grounded and the collector of it is connected to the positive terminal of a DC source (not shown) through a relay Y3. A second switching means S2 is formed as shown on the dotted lines. The positive terminal of the DC source is connected to ground through the contact y12 of the relay Y1 and the relay Y4. Electrode P1 is short-circuited by the conductive foil affixed to the endless tape T1. A connecting point where the relay Y4 is connected to the electrode P1 is grounded through a contact y43 and is also connected to the contact y42 through an oscillator circuit 6 which generates a beep tone. The contact y42 is connected to a terminal of the secondary winding of the transformer 3.

The output terminal of amplifier 4 is connected to a magnetic head H2 which is related to a magnetic tape T2 whereon the incoming message is recorded. the magnetic tape T2 is started after the beep tone is generated by oscillator circuit 6. The positive terminal of the DC source is grounded through a condenser C4 and contact y13 of the relay Y1. Contact y31 of the relay Y3 forms a series circuit with a resistor R1, and the series circuit is connected parallel to the condenser C4. Thus a first timer means if formed as shown in a dotted line 7.

The contact y13 is directly connected to the base of a transistor Tr2. The collector of the transistor Tr2 is directly connected to the base of a transistor Tr3. The collector of the transistor Tr3 is connected to the positive terminal of the source through the relay Y1. The base of the transistor Tr3 is connected to the positive terminal of the source is connected to the base of a transistor Tr4 through a resistor R4. The source is grounded through a condenser C5 and contact Y14 of the relay Y1. Thus a second timer means is formed as shown on dotted line 8. The base of the transistor Tr4 is grounded by contact y32 of the relay Y3 and contact y21 of the relay Y2 respectively. Emitters of the transistor Tr4 and Tr2 are directly connected to each other. The collector of the transistor Tr4 is directly connected to the base of the transistor Tr3. Thus a first switching means is formed as shown in dotted line S1. The transistors Tr2 and Tr3 of the first switching means are OFF and the transistor Tr4 is ON in the stand-by state of the apparatus. When a ringing signal is received the transistor Tr3 turns on but transistors Tr2 and Tr4 are OFF.

Now, the operation of the above-mentioned circuit will be explained in detail. When a ringing current (bell signal) is applied to the terminal 1, the current is rectified by the rectifier circuit 2 and regulated by the condenser C3 causing the relay Y2 to energize. The contact y21 of the relay Y2 is switched, the transistor Tr4 is turned OFF and the transistor Tr3 is turned ON, causing the relay Y1 to energize. Each contact y11, y12, y13 and y14 of the relay Y1 is switched respectively, the relay Y2 is released and the contact y21 is opened. But as the contact y14 connects the condenser C5 with the base of the transistor Tr4, the relay Y1 maintains its energization for a period which is determined by the time constant of the condenser C5 and the resistor R4. Simultaneously with the operation, the other contact of the relay Y1 (not shown) is switched causing the endless tape T1 to begin to run. Consequently, the outgoing message is sent to the caller through the contact y41, the amplifier 4, the contact y42 and the transformer 3. When the endless tape T1 runs approximately one revolution, a conductive foil afixed to the tape T1 short-circuits the electrode P1, and causes the oscillator circuit 6 to generate a beep tone to the caller through the transformer 3 and the terminal 1. The beep tone informs the caller that the outgoing message is completed and that the apparatus is going to switch to the recording state to record the incoming message of the caller.

When the electrode P1 is short-circuited by the conductive foil, the relay Y4 is energized and its contacts y41, y42 and y43 are switched and the relay Y4 is continuously held on by its own contact y43. This establishes the recording state.

Figure 2:
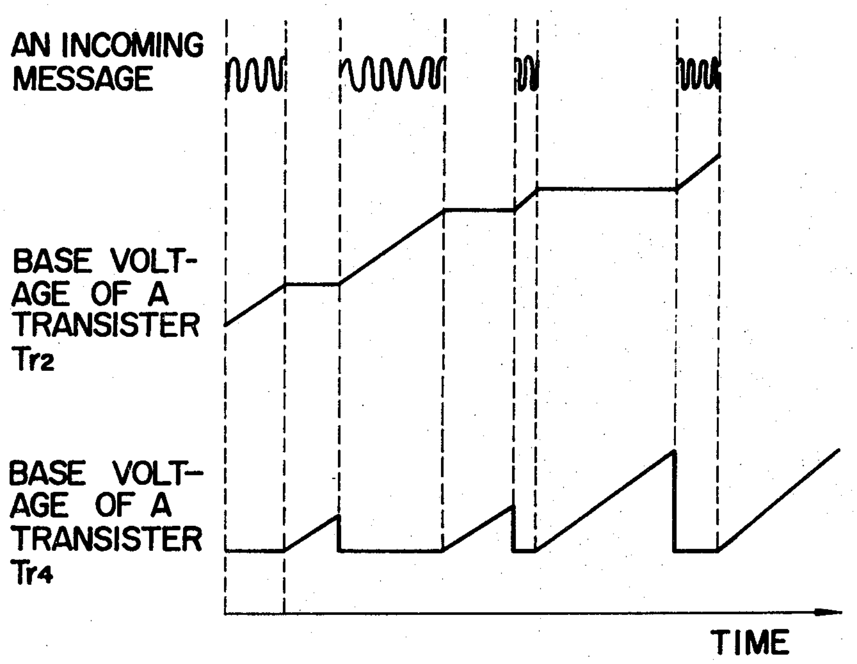
FIG. 2 is a relation chart between time and voltage for the operation of the circuit shown in FIG. 1.

The incoming message from the caller passes through the transformer 3 and the contact y41 and is amplified by the amplifier 4. A portion of the output signal of the amplifier 4, simultaneously being recorded on the magnetic tape T2, is applied to rectifier circuit 5 through the contact y42. In response to the incoming message, the transistor Tr1 is turned ON and OFF and the relay Y3 is energized or released. With every operation of the relay Y3, the condenser C4 is discharged through the contact y31 and the resistor R1, as shown in FIG. 2 (the base voltage of the transistor Tr2). When the condenser C4 is discharged to a certain voltage, the transistor Tr2 is turned ON and the transistor Tr3 is turned OFF. Consequently, the relay Y1 is released and its contacts y11, y12, y13 and y14 are returned to the position shown, and the apparatus returns to the stand-by state to await the next call.

Thus, when the incoming message is continuous or has short pauses between words when one is speaking, the condenser C4 is discharged but when the incoming message has long pauses the transistor Tr1 does not turn ON and, the relay Y3 is not energized. Therefore the contact y32 stays open, the base voltage of the transistor Tr4 becomes higher as shown in FIG. 2, and the transistor Tr4 is turned ON after a certain period. Consequently, the transistor Tr3 is turned OFF and the relay Y1 is released causing the apparatus to return to the stand-by state. But if in the midst of the period of the raising of the base potential of Tr4 the incoming message from the caller is again applied to the transistor Tr1, the relay Y3 is energized and the contact y32 is closed and the transistor Tr4 is continuously held OFF.

The present invention, as described hereinabove, has a first timer means which stops the timer period while the incoming message is paused and making the timer period progress only at the time when the incoming message is received. Therefore, if there are short pause times in the recording period for the incoming message, said period is not shortened substantially. Further the present invention has the second timer means which makes the timer period progress at only pause times of the incoming message and which makes this period return to the starting point when the incoming message is again received. In this manner the magnetic tape for recording the incoming message can be effectively used.

While the invention has been particularly shown and described with reference to the preferred embodiment thereof, it will be understood by those skilled in the art that various changes in form and details may be made therein without departing from the spirit and scope of the invention.

I claim:

1. An automatic telephone answering apparatus for connection to a telephone line comprising:

a. first switching means, which operates in response to a ringing current on said telephone line, for maintaining a connection between said telephone line and said apparatus;

b. second switching means connected to said telephone line for operating in response to message incoming message signal, said second switching means being in a non-operating state when connected to said telephone line and no incoming message signal is being received;

c. first timer means, connected to said second switching means, said first timer means having a first time period wherein said first timer means progresses through said first time period only when said second switching means is operating in response to an incoming message signal wherein said first time period is the maximum time in which said apparatus is connected to said telephone line, said first timer means causing said first switching means to cease operation after said first time period; and d. second timer means, connected to said second switching means, said second timer means having a second time period which is shorter than said first timer period, said second timer being reset by each operation of said second switching means, wherein said second time period is the maximum time in which said apparatus is connected to said telephone line when no incoming message signal is received, said second timer means causing said first switching means to cease operation after the completion of said second time period.

2. The automatic telephone answering apparatus of claim 1 further including means coupled to said first switching means for sending a message to a calling party in response to the operation of said first switching means.

3. The automatic telephone answering apparatus of claim 2 wherein said means for sending a message to a calling party further includes means for causing said second switching means to be connected to said telephone line after said message has been sent.

4. The telephone answering apparatus of claim 1 wherein said second switching means comprises a solid state switching means and a relay connected in a series circuit wherein the receipt of an incoming message signal operates said solid state switching means to energize said relay whereby the energization of said relay switches a contact of said relay to cause said first timer means to progress through said first timer period.

5. The telephone answering apparatus of claim 4 wherein said relay includes a contact connected in said second timer circuit wherein the energization of said relay causes said contact to complete a circuit for resetting said second timer means.

* * * * *